United States Patent
Hogg et al.

(10) Patent No.: US 8,245,434 B2
(45) Date of Patent: Aug. 21, 2012

(54) SOLID STATE FLEXURE FOR POINTING DEVICE

(75) Inventors: Kevin Hogg, Orlando, FL (US); Carlos Casteleiro, Clermont, FL (US)

(73) Assignee: Cubic Corporation, San Diego, CA (US)

( * ) Notice: Subject to any disclaimer, the term of this patent is extended or adjusted under 35 U.S.C. 154(b) by 460 days.

(21) Appl. No.: 12/474,201

(22) Filed: May 28, 2009

(65) Prior Publication Data
US 2010/0302542 A1 Dec. 2, 2010

(51) Int. Cl.
*F41G 1/16* (2006.01)

(52) U.S. Cl. ............... 42/115; 42/114; 42/116; 362/110

(58) Field of Classification Search ............... 356/301, 356/138; 248/466, 487, 479, 476, 276.1, 248/278.1, 184.1, 27.1, 231.9, 231.91, 284.1, 248/371, 140, 485, 180.1; 372/107, 36; 42/114–117, 142, 146; 89/41.17, 41.19; 362/110–114; 385/90
See application file for complete search history.

(56) References Cited

U.S. PATENT DOCUMENTS

| | | | |
|---|---|---|---|
| 3,407,018 A * | 10/1968 | Miller | 359/896 |
| 3,700,313 A * | 10/1972 | Karr et al. | 359/873 |
| 3,883,820 A * | 5/1975 | Burns et al. | 372/107 |
| 4,281,993 A | 8/1981 | Shaw | |
| 4,442,524 A * | 4/1984 | Reeder et al. | 372/107 |
| 4,522,365 A * | 6/1985 | Tabares | 248/466 |
| 4,672,626 A | 6/1987 | Koseki | |
| 4,712,444 A * | 12/1987 | Lewis | 74/490.13 |
| 4,842,397 A * | 6/1989 | Eisler | 359/896 |
| 5,299,375 A * | 4/1994 | Thummel et al. | 42/115 |
| 5,323,555 A * | 6/1994 | Jehn | 42/115 |
| 5,411,235 A | 5/1995 | Rumbaugh | |
| 5,703,683 A | 12/1997 | Hunt et al. | |
| 6,406,298 B1 | 6/2002 | Varshneya et al. | |
| 6,450,726 B1 * | 9/2002 | Baudu et al. | 403/83 |
| 7,331,137 B2 * | 2/2008 | Hsu | 42/114 |
| 8,056,879 B2 * | 11/2011 | Chang et al. | 248/478 |

OTHER PUBLICATIONS

PCT International Search Report and Written Opinion mailed Jul. 23, 2010; International Application No. PCT/US2010/034879; 12 pages.

* cited by examiner

*Primary Examiner* — Terrell McKinnon
*Assistant Examiner* — Ingrid M Weinhold
(74) *Attorney, Agent, or Firm* — Kilpatrick Townsend & Stockton LLP

(57) ABSTRACT

A system for achieving multi-axis angular alignment of devices includes a monolithic mount. The mount includes three sections arranged along a longitudinal axis. The first two sections are connected by two flexures that constrain the second section to rotate in relation to the first section in a first rotational degree of freedom. The second and third sections are connected by flexures that constrain the third section to rotate in relation to the second section in a second rotational degree of freedom. The first and second rotational degrees of freedom are different. Actuating screws contact bearing surfaces on the mount to actuate the rotations.

14 Claims, 5 Drawing Sheets

VIEW A-A

SECTION C-C

VIEW B-B

SECTION D-D

SOLID STATE FLEXURE FOR POINTING DEVICE

BACKGROUND OF THE INVENTION

Many systems depend on the accurate and durable angular alignment of components. For example, a military training system may simulate a combat environment using optical emitters such as lasers mounted to simulated weapons, and sensors on various targets to register when laser light hits the targets, indicating accurate fire. In order to ensure effective training, it is required that the lasers "point" or accurately be boresighted in the direction an actual or simulated weapon would fire. Because of variations in the manufacture of lasers such as vertical cavity surface emitting lasers (VCSELs), adjustment of the laser alignment is often necessary to achieve accurate boresighting.

Military training is also an example of an environment in which alignments may be difficult to maintain. Lasers and other equipment may undergo intense shock and vibration, and mounting and alignment systems for the lasers should maintain proper alignment even when subjected to such treatment. Even in less demanding environments, the alignment process should be easy to accomplish and stable once achieved. For example, laboratory optical experiments may be facilitated when laser alignment is simple and reliable, reducing alignment time and minimizing production and testing costs.

Previous alignment systems have been complex, expensive, and prone to misalignment in dynamic environments. One particular prior system uses a pair of wedge-shaped prisms, called Risley prisms, placed sequentially in the path of a laser. The prisms may be rotated independently about the optical axis of the laser. Rotating the prisms with respect to each other changes the net overall deflection of the beam, and rotating the prisms as a pair changes the direction in rotation in which the deflection takes place, so that the beam may be aimed in any direction within a small solid angle about the nominal laser axis. Such a system has several moving parts, including the prisms and elements for actuating the prisms. The prisms introduce four optical surfaces into the optical path, which result in loss of signal in the system, as well as produce stray reflections. The surfaces of the prisms may become dirty, cloud up due to condensation, or otherwise lose transparency due to environmental effects. Shock and vibration control is harder to achieve when multiple parts are included in an assembly. Misalignment and breakdown will often occur.

There is accordingly a need for an angular alignment device that is mechanically simple and reliable, and alleviates the above problems.

BRIEF SUMMARY OF THE INVENTION

In one embodiment, a monolithic mount for achieving multi-axis angular adjustment of devices includes first, second, and third generally tubular sections sequentially arranged along a longitudinal axis and surrounding a bore that passes through all three sections. The bore through the first section defines the longitudinal axis of the monolithic mount. The mount also includes a first set of two flexures flexibly connecting the first and second sections, the two flexures in the first set positioned on opposing sides of the bore and constraining the second section to rotate with respect to the first section in a first rotational degree of freedom transverse to the bore. The mount further includes a second set of two flexures flexibly connecting the second and third sections, the two flexures in the second set positioned on opposing sides of the bore and constraining the third section to rotate with respect to the second section in a second rotational degree of freedom transverse to the bore. The first and second rotational degrees of freedom are different. A plurality of bearing surfaces on at least one of the second and third sections receive ends of actuating screws that rotate the second and third sections with respect to the first section.

In some embodiments, the first and second rotational degrees of freedom are orthogonal to each other. The first section may include four threaded holes parallel to the longitudinal axis for receiving threaded actuating screws, and the plurality of bearing surfaces may include four bearing surfaces on an end face of the third section, each bearing surface configured to receive an end of one of the four actuating screws. The second section may include four passages for enabling the four actuating screws to reach the third section without engaging the second section.

In other embodiments, the first section includes four threaded holes parallel to the longitudinal axis for receiving threaded actuating screws, and the plurality of bearing surfaces includes two bearing surfaces on an end face of the second section and two bearing surfaces on an end face of the third section. Each bearing surface is configured to receive an end of one of the four actuating screws. The second section may include two passages for enabling two of the four actuating screws to reach the third section without engaging the second section. The bearing surfaces may be on an outside face of the third section, and are configured to receive ends of actuating screws oriented perpendicular to the longitudinal axis of the monolithic mount.

In some embodiments, the first section is of a larger dimension than the second and third sections in a direction transverse to the longitudinal axis such that a shoulder is formed on the first section. The shoulder is configured for receiving a fastener for affixing the monolithic mount to a panel. The mount may include a pin extending from the shoulder and parallel to the longitudinal axis, the pin configured for engaging a hole in the panel for rotationally aligning the monolithic mount in the hole.

In another embodiment, a system for achieving multi-axis angular adjustment of devices includes a monolithic mount and four actuating screws. The monolithic mount includes first, second, and third generally tubular sections sequentially arranged along a longitudinal axis and surrounding a bore that passes through all three sections, the bore defining the longitudinal axis of the monolithic mount. The mount further includes a first set of two flexures flexibly connecting the first and second sections, the two flexures in the first set positioned on opposing sides of the bore and constraining the second section to rotate with respect to the first section in a first rotational degree of freedom transverse to the bore. The mount according to this embodiment also includes a second set of two flexures flexibly connecting the second and third sections, the two flexures in the second set positioned on opposing sides of the bore and constraining the third section to rotate with respect to the second section in a second rotational degree of freedom transverse to the bore, the first and second rotational degrees of freedom being different. The mount further includes a plurality of bearing surfaces on at least one of the second and third sections for receiving ends of actuating screws that rotate the second and third sections with respect to the first section, and four threaded holes through the first section, each of the four threaded holes parallel to the longitudinal axis of the monolithic mount and configured for receiving a threaded actuating screw. One actuating screw is threaded into each of the four threaded holes.

In some embodiments, the four actuating screws are all of the same length. Each of the four screws may contact one of the plurality of bearing surfaces on the third section. Two of the four screws may contact bearing surfaces on the third section, and the other two of the four screws may contact bearing surfaces on the second section. The system may further include a device aligned by the system. The device aligned by the system may be an optical device. The device aligned by the system may emit light. The device aligned by the system may be a laser, and the alignment may adjust the aiming of the laser. The device aligned by the system may be a sensor.

DETAILED DESCRIPTION OF THE INVENTION

Figure 1A:
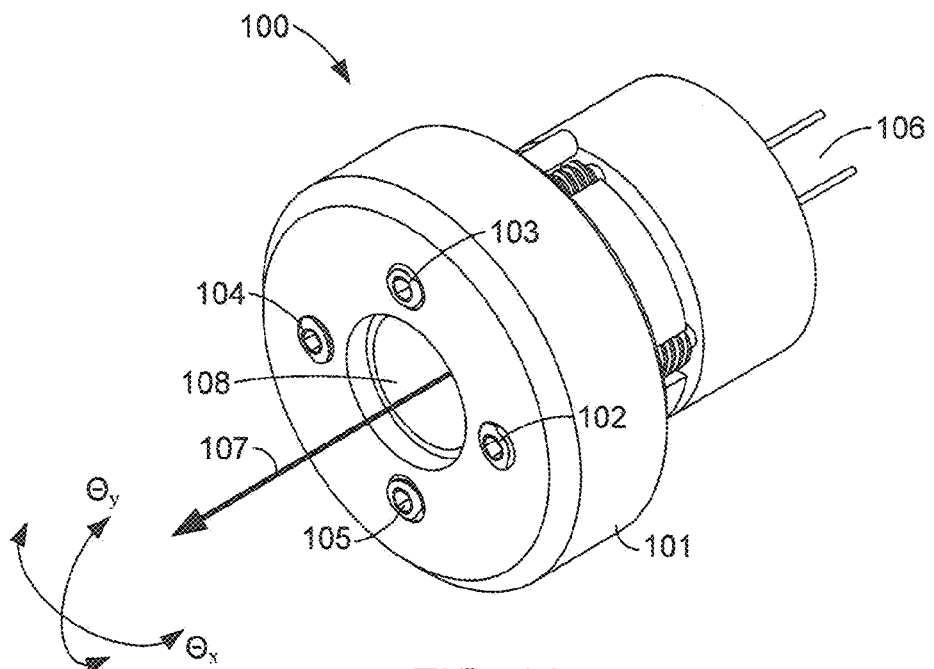
FIGS. 1A and 1B illustrate perspective views of an alignment system according to an embodiment of the invention.
Figure 1B:
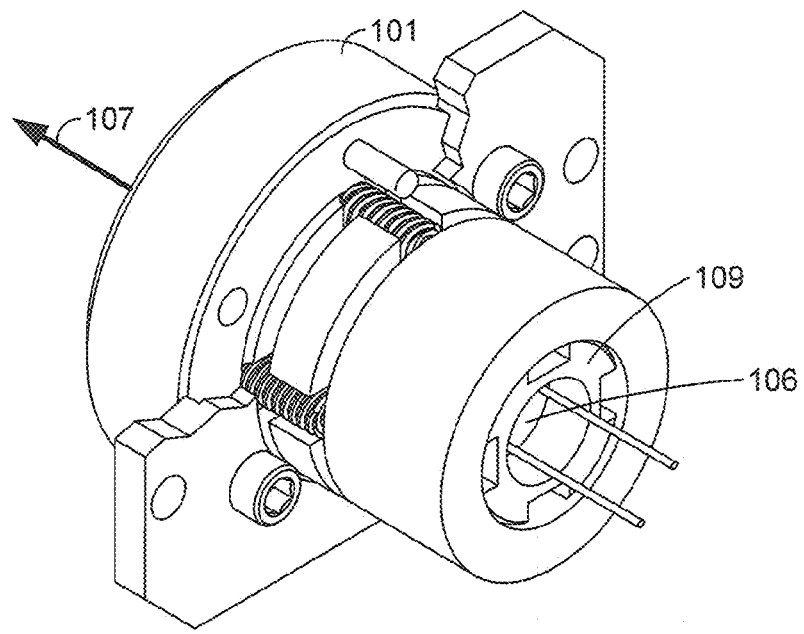

FIGS. 1A and 1B illustrate perspective views of an alignment system 100 according to an embodiment of the invention. The system comprises a monolithic mount 101, four actuating screws 102-105, and a semiconductor laser 106. The structure of monolithic mount 101 will be described in more detail below. In use, example system 100 allows the adjustment of the aim of laser beam 107 in two orthogonal angular degrees of freedom $\Theta_x$ and $\Theta_y$ by simply turning screws 102-105 in a suitable sequence. Laser beam 107 is emitted through bore 108. The system is suitable for panel mounting, as is shown in FIG. 1B, and the angular adjustment can be accomplished from one side of the panel. Laser 106 may be, for example, packaged in a standard TO-style package that is retained in mount 101 by retainer 109, but other kinds of attachments are possible. For example, a laser or other element may be attached to mount 101 using an adhesive, a clamp, a press fit, threads, one or more fasteners, or by some other means.

Figure 2A:
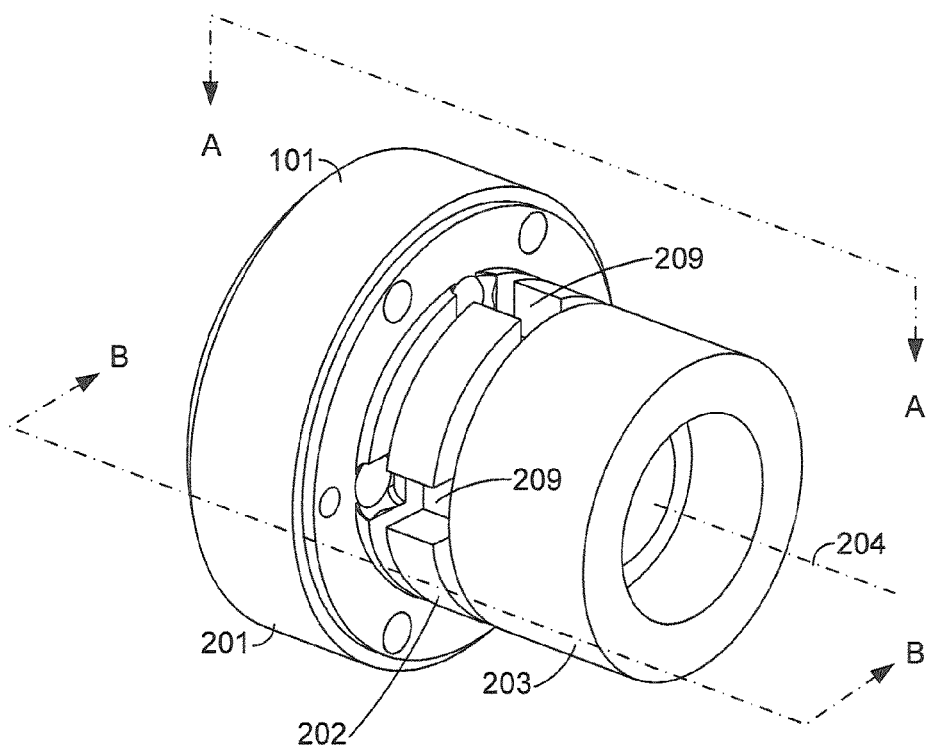
FIGS. 2A and 2B show front and rear perspective views of a monolithic mount according to an embodiment of the invention.
Figure 2B:
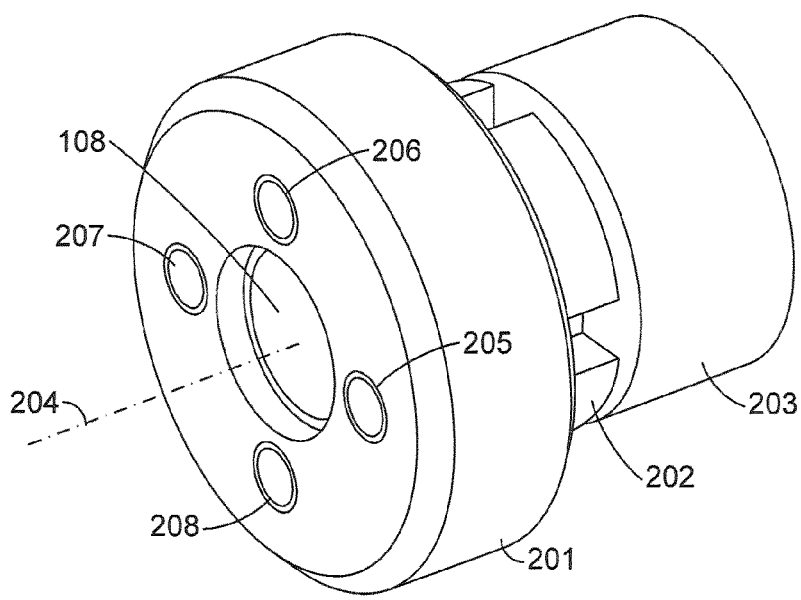

FIGS. 2A and 2B show front and rear perspective views of monolithic mount 100. Bore 108 defines a longitudinal axis 204 of mount 101. Mount 101 comprises three main sections 201, 202, and 203, arranged sequentially along longitudinal axis 204, with second section 202 residing between first section 201 and third section 203. The sections 201, 202, and 203 are generally tubular, and while they are shown as cylindrical in the Figures, this is not a requirement. For example, the sections may have any suitable cross-sectional shape, including round, oval, square, polygonal, or another shape. Monolithic mount 101 may be fabricated by any suitable process, from any suitable material. In one embodiment, mount 101 is machined from 303 stainless steel, but other processes and materials are possible. For example, mount 101 may be machined from another material such as aluminum, acetal, or another metal or plastic, or may be made from a molded polymer such as acetal, polycarbonate, ABS, or any other suitable polymer, or a combination or blend of polymers. Mount 101 may be formed using a combination of processes. For example, mount 101 may be roughly formed by molding, casting, powder metallurgy, or the like, and certain fine features such as threads formed by machining. Many other materials and fabrication methods are possible within the scope of the claims.

Monolithic mount 101 also includes four threaded holes 205-208, for receiving screws 102-105. The function of passages 209 through second section 202 will be explained below.

Figure 3:
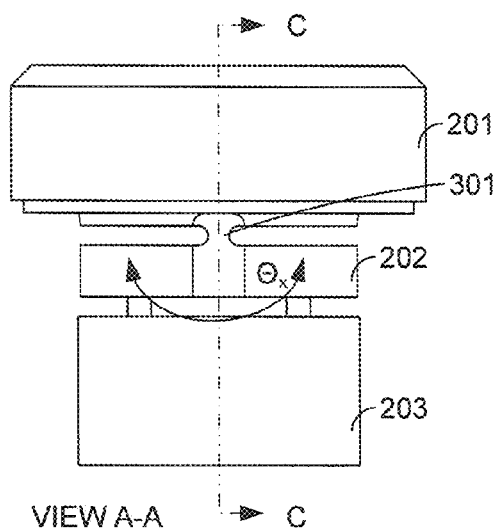
FIG. 3 shows an orthogonal view of the monolithic mount of FIG. 2A, as seen from direction A-A shown in FIG. 2A.
Figure 4:
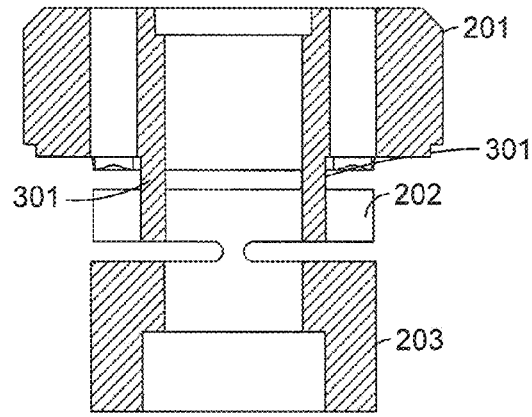
FIG. 4 shows a cross-section view of the monolithic mount of FIG. 2A, taken through section C-C shown in FIG. 3.

FIG. 3 shows an orthogonal view of monolithic mount 101, as seen from direction A-A shown in FIG. 2A. FIG. 4 shows a cross-section view of monolithic mount 101, taken through section C-C shown in FIG. 3. Referring to both FIGS. 3 and 4, a pair of flexures 301 flexibly connect first section 201 and second section 202. Flexures 301 are sized to be relatively rigid in tension and compression, while being relatively flexible in bending. For example, the flexures may be sized to allow a predetermined range of rotation without undergoing plastic deformation. As a result, the two flexures 301 constrain second section 202 to rotate in a first degree of freedom $\Theta_x$ with respect to first section 201. This first rotational degree of freedom $\Theta_x$ is transverse to longitudinal axis 204. That is, second section 202 rotates about an axis that is transverse to longitudinal axis 204.

Figure 5:
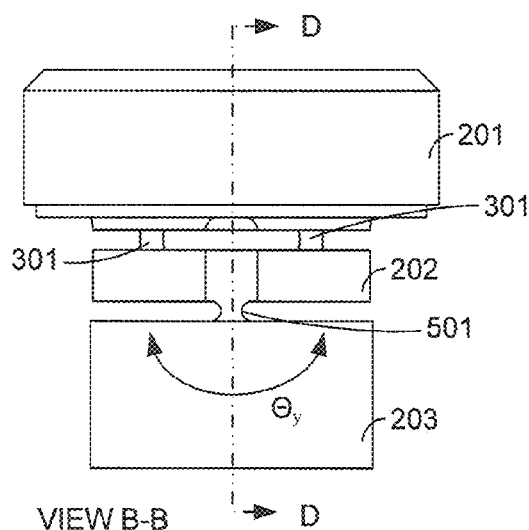
FIG. 5 shows an orthogonal view of the monolithic mount of FIG. 2A, as seen from direction B-B shown in FIG. 2A.
Figure 6:
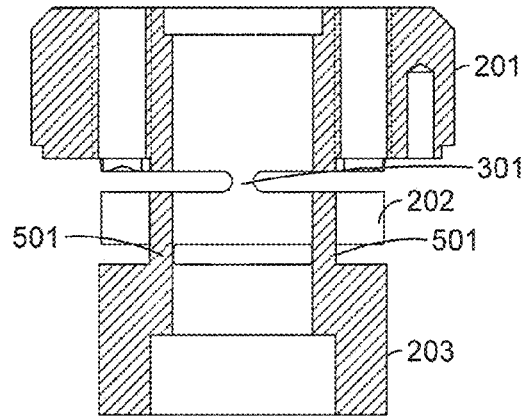
FIG. 6 shows a cross-section view of the monolithic mount of FIG. 2A, taken through section D-D shown in FIG. 5.

FIG. 5 shows an orthogonal view of monolithic mount 101, as seen from direction B-B shown in FIG. 2A. FIG. 6 shows a cross-section view of monolithic mount 101, taken through section D-D shown in FIG. 5. Referring to both FIGS. 5 and 6, a second pair of flexures 501 flexibly connect second section 202 and third section 203. Flexures 501 are also sized to be relatively rigid in tension and compression, but relatively flexible in bending. As a result, the two flexures 501 constrain third section 203 to rotate in a second degree of freedom $\Theta_y$ with respect to second section 202. This second rotational degree of freedom $\Theta_y$ by is also transverse to longitudinal axis 204, and is different from the first rotational degree of freedom $\Theta_x$. In this example embodiment, $\Theta_x$ and $\Theta_y$ are orthogonal to each other, but this is not a requirement.

Figure 7:
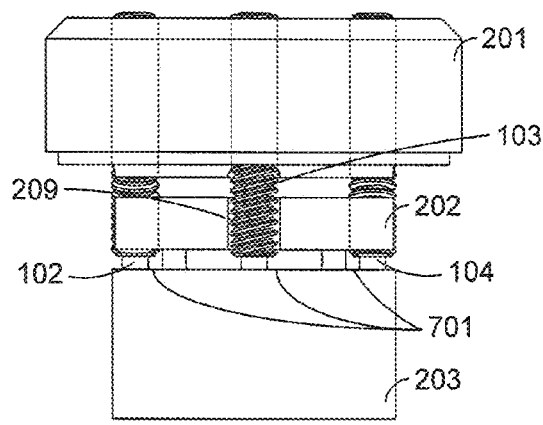
FIG. 7 shows the monolithic mount of FIG. 2A, with actuating screws in place.

FIG. 7 shows a view similar to that of FIG. 3, but with screws 102, 103, 104, and 105 in place. Screws 102-105 have been threaded into holes 205-208 respectively. (Screw 105 is not visible in this view.) An end of each screw 102-105 just reaches and bears against bearing surface 701 of monolithic mount 101. In this embodiment, all four screws 102-105 are conveniently the same length and diameter, although this is not a requirement. To accomplish an adjustment, a user may back two of the screws away from bearing surface 701. The two screws backed away should be one from each degree of freedom, for example screws 102 and 103, involved in adjusting $\Theta_x$ and $\Theta_y$ respectively. The other screws are then rotated, still bearing against bearing surface 701, until the desired alignment is achieved. The rotation of the screws causes the screws to traverse longitudinally within first section 201, and therefore move the contact points on bearing surface 701. The user may wish to exert light side pressure on third section 203 during the adjustment, to maintain contact between the two screws being adjusted and bearing surface 701. Preferably, an alignment fixture indicates when proper adjustment is achieved. Finally, the screws previously backed away are turned so that they once again bear against bearing surface 701. Once all four screws 102-105 bear against surfaces 701, with flexures 301 and 501 in light tension, first and third sections 201 and 203 of monolithic mount 101 are completely constrained with respect to each other, and the adjustment in the $\Theta_x$ and $\Theta_y$ degrees of freedom may be finished.

Figure 8:
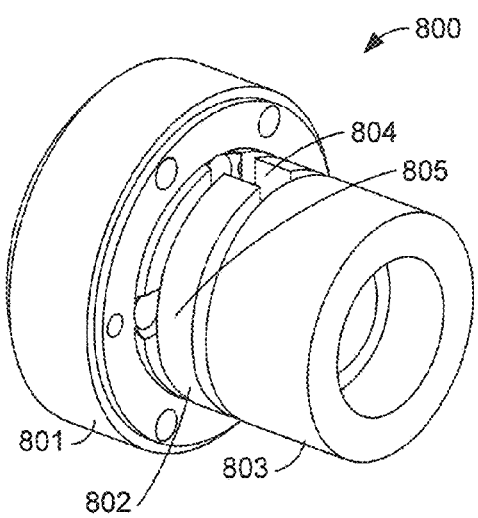
FIG. 8 shows a monolithic mount in accordance with a second embodiment.

FIG. 8 shows monolithic mount 800 in accordance with a second embodiment. Mount 801 includes first, second, and third sections 801, 802, and 803 arranged in sequence along a longitudinal axis. In may respects mount 800 functions similarly to mount 101 described above. However, mount 800 includes only two channels 804 through second section 802. In the corresponding other locations where channels existed in mount 101, for example location 805, no channels are present in mount 800.

Figure 9:
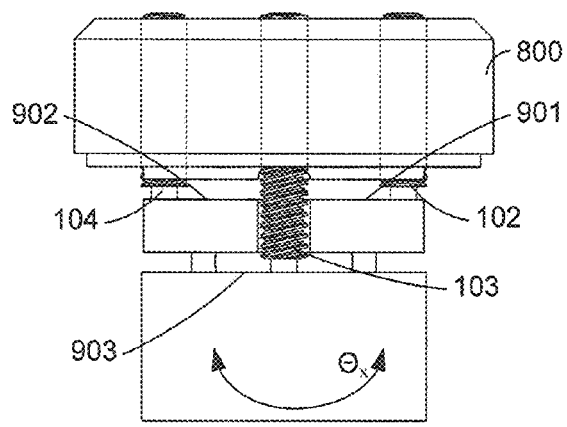
FIG. 9 shows the monolithic mount of FIG. 8, with actuating screws in place.

FIG. 9 shows and orthogonal view of mount 800, with screws 102-105 in place. (Screw 105 is not visible in this view.) In this embodiment, screws 102 and 104 are conveniently (but need not be) of a shorter length than screws 103 and 105, and bear on bearing surfaces 901 and 902 of mount 800, while screws 103 and 105 bear on surface 903. This embodiment may have the advantage that the adjustment in $\Theta_x$ may be accomplished and locked independently of the adjustment in $\Theta_y$. To accomplish an adjustment in the $\Theta_x$ degree of freedom, a user may back one of screws 102 or 104 away from its respective bearing surface, and then rotate the other screw, still bearing against its respective bearing surface, until the desired alignment is achieved. The screw that was backed away can then be turned until it bears against its respective bearing surface, constraining sections 801 and 802 with respect to each other. Then the adjustment in $\Theta_y$ may be performed similarly.

It may be preferable to perform the alignment in first degree of freedom $\Theta_x$ before the alignment in second degree of freedom $\Theta_y$, but this is not a requirement, and the adjustments may be performed in the opposite order if desired. Optionally, in any of the embodiments, screws 102-105 may be constrained or configured in some way to help ensure that the remain fixed with respect to first section 201. For example, a thread-locking adhesive may be applied to the screws before or after the alignment is complete. Screws 102-105 may be standard fine-thread set screws, may be another standard kind of screw, or may have non-standard features.

Figure 10:
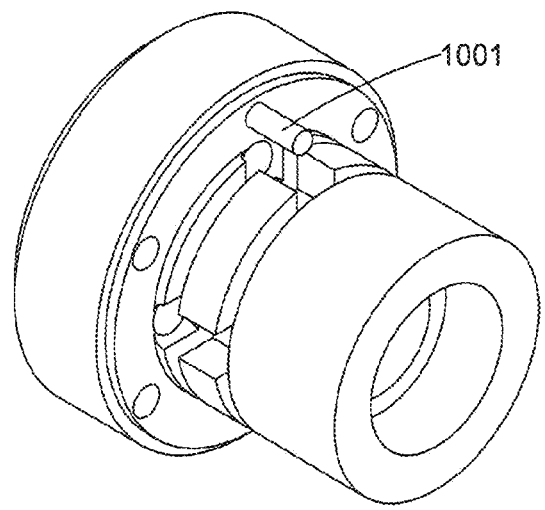
FIG. 10 illustrates a clocking feature in the form of pin.

An alignment system in accordance with embodiments of the invention may conveniently be panel mounted. Because first section 201 of monolithic mount 101 is larger in transverse dimension than second and third sections 202 and 203, a shoulder is formed on or by first section 201. Panel mounting is illustrated in FIG. 1B. So that the alignment axes $\Theta_x$ and $\Theta_y$ are consistently oriented with respect to the panel, a clocking feature may be provided on monolithic mount 101. FIG. 10 illustrates a clocking feature in the form of pin 1001. Pin 1001 may conveniently be inserted into a second hole in a panel onto which monolithic mount 101 is mounted. Because pin 1001 is placed in a known position with respect to flexures 301 and 501, the orientation of the $\Theta_x$ and $\Theta_y$ degrees of freedom will be as expected, even if a system including monolithic mount 101 is replaced during service or repair.

Figure 11:
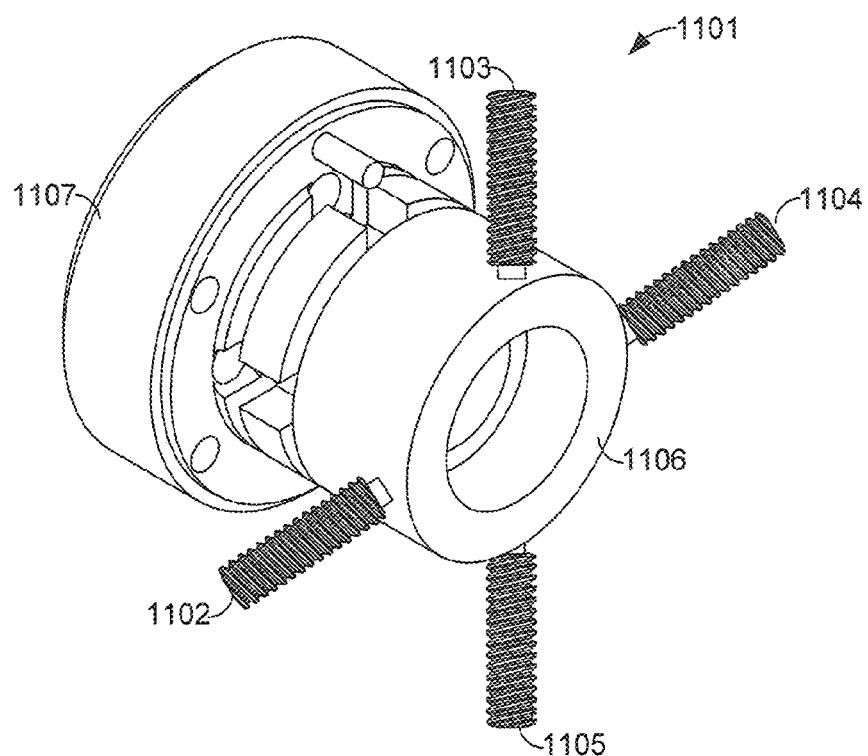
FIG. 11 illustrates a perspective view of a monolithic mount, in accordance with another embodiment.

FIG. 11 illustrates a perspective view of a monolithic mount 1101, in accordance with another embodiment. In this embodiment, actuating screws 1102-1105 are positioned transversely to monolithic mount 1101. For example, screws 1102-1105 may be threaded into additional structure surrounding monolithic mount 1101 but not shown in the figure. Each of screws 1102-1105 bears on the outside surface of third section 1106 of mount 1101. Adjusting the positions of the screws then moves third section 1106. Flexures like those previously described constrain third section 1106 to move in two rotational degrees of freedom with respect to first section 1107 of mount 1101. This embodiment may have the advantage that the flexures are not placed in tension during the alignment, and there may be less risk of overstressing the flexures and damaging the mount.

What is claimed is:

1. A system for achieving multi-axis angular adjustment of devices, the system comprising:
    four threaded actuating screws; and
    a monolithic mount including:
        first, second, and third generally tubular sections sequentially arranged along a longitudinal axis and surrounding a bore that passes through all three sections, the bore through the first section defining the longitudinal axis of the monolithic mount;
        a first set of two flexures flexibly connecting the first and second sections, the two flexures in the first set positioned on opposing sides of the bore and constraining the second section to rotate with respect to the first section in a first rotational degree of freedom transverse to the bore;
        a second set of two flexures flexibly connecting the second and third sections, the two flexures in the second set positioned on opposing sides of the bore and constraining the third section to rotate with respect to the second section in a second rotational degree of freedom transverse to the bore, the first and second rotational degrees of freedom being different;
        four threaded holes in the first section for receiving the four threaded actuating screws for rotating the second and third sections with respect to the first section, the four threaded holes being parallel to the longitudinal axis of the mount; and
        four bearing surfaces on an end face of the third section, each bearing surface configured to receive an end of one of the four threaded actuating screws; and
        four passages in the second section for enabling the four actuating screws to reach the third section without engaging the second section.

2. The system for achieving multi-axis angular adjustment of devices as recited in claim 1, wherein the first and second rotational degrees of freedom are orthogonal to each other.

3. The system for achieving multi-axis angular adjustment of devices as recited in claim 1, wherein the first section is of a larger dimension than the second and third sections in a direction transverse to the longitudinal axis such that a shoulder is formed on the first section, the shoulder configured for receiving a fastener for affixing the monolithic mount to another structure.

4. The system for achieving multi-axis angular adjustment of devices as recited in claim 1, further comprising a pin extending from the shoulder and parallel to the longitudinal axis, the pin configured for engaging an opening in the other structure for rotationally aligning the monolithic mount in the hole.

5. The system for achieving multi-axis angular adjustment of devices as recited in claim 1, wherein the four actuating screws are all of the same length.

6. The system for achieving multi-axis angular adjustment of devices as recited in claim 3, wherein the other structure is a weapon or a simulated weapon.

7. A system for achieving multi-axis angular adjustment of devices, the system comprising:

four actuating screws; and a monolithic mount including:

first, second, and third generally tubular sections sequentially arranged along a longitudinal axis and surrounding a bore that passes through all three sections, the bore defining the longitudinal axis of the monolithic mount;

a first set of two flexures flexibly connecting the first and second sections, the two flexures in the first set positioned on opposing sides of the bore and constraining the second section to rotate with respect to the first section in a first rotational degree of freedom transverse to the bore;

a second set of two flexures flexibly connecting the second and third sections, the two flexures in the second set positioned on opposing sides of the bore and constraining the third section to rotate with respect to the second section in a second rotational degree of freedom transverse to the bore, the first and second rotational degrees of freedom being different;

four threaded holes through the first section for receiving the four actuating screws for rotating the second and third sections with respect to the first section, each of the four threaded holes parallel to the longitudinal axis of the monolithic mount and wherein one of the four actuating screws is threaded into each of the four threaded holes;

two bearing surfaces on an end face of the second section and two bearing surfaces on an end face of the third section, each bearing surface configured to receive an end of one of the four actuating screws; and two passages in the second section for enabling two of the four actuating screws to reach the third section without engaging the second section.

8. The system for achieving multi-axis angular adjustment of devices as recited in claim 7, further comprising a device aligned by the system.

9. The system for achieving multi-axis angular adjustment of devices as recited in claim 8, wherein the device aligned by the system is an optical device.

10. The system for achieving multi-axis angular adjustment of devices as recited in claim 9, wherein the device aligned by the system emits light.

11. The system for achieving multi-axis angular adjustment of devices as recited in claim 10, wherein the device aligned by the system is a laser, and the alignment adjusts the aiming of the laser.

12. The system for achieving multi-axis angular adjustment of devices as recited in claim 8, wherein the device aligned by the system is a sensor.

13. The system for achieving multi-axis adjustment of devices as recited in claim 7, wherein the first section is of a larger dimension than the second and third sections in a direction transverse to the longitudinal axis such that a shoulder is formed on the first section, the shoulder configured for receiving a fastener for affixing the monolithic mount to another structure.

14. The system for achieving multi-axis angular adjustment of devices as recited in claim 13, wherein the other structure is a weapon or a simulated weapon.

* * * * *